US005265345A

United States Patent [19]

Natali et al.

[11] Patent Number: 5,265,345

[45] Date of Patent: Nov. 30, 1993

[54] UNIVERSAL SUN-CLOCK

[75] Inventors: Angelo Natali; Franco Natali, both of Milan, Italy

[73] Assignee: Navir snc di Natali A.&C., Milan, Italy

[21] Appl. No.: 952,367

[22] Filed: Sep. 28, 1992

[30] Foreign Application Priority Data

Apr. 3, 1992 [IT] Italy ...................... MI 92 U 000327

[51] Int. Cl.[5] ............................................ G01C 17/34

[52] U.S. Cl. ........................................ 33/270; 33/271

[58] Field of Search .................. 33/268, 269, 270, 271

[56] References Cited

U.S. PATENT DOCUMENTS 2,488,605 11/1949 Progneaux ............................ 33/271

2,963,790 12/1960 Hall ...................................... 33/271

FOREIGN PATENT DOCUMENTS 214034 4/1924 United Kingdom ................. 33/271

*Primary Examiner*—William A. Cuchlinski, Jr.

*Assistant Examiner*—Alvin Wirthlin

*Attorney, Agent, or Firm*—Hedman, Gibson & Costigan

[57] ABSTRACT

A universal sun-clock is described comprising a base, on whose surface there are present a sun-dial (consisting of a clock-face and a time-pointing tongue) and a reference mark for orienting the sun-clock according to the longitude and an upright (hinged to an end of a support which can be drawn out from the base) bearing a semicircular sector, free to rotate around a pin, on which sector a latitude scale (graduated from 90° of latitude North to 90° of latitude South) is marked: an index integral with the upright allows to read the latitude on the semicircular sector. When the sun-clock is in a working position the support is drawn out from the base and the upright is rotated around its hinge until it is perpendicular to the base, whereas when the sun-clock is in a rest position, the support is retracted into the base and the upright, by rotating round its hinge, is pulled down onto the base.

4 Claims, 3 Drawing Sheets

UNIVERSAL SUN-CLOCK

FIELD OF THE INVENTION

The object of the present invention comprises a universal sun-clock comprising a base, on whose surface is a sun-dial (consisting of a clock-face and of the respective time-pointing tongue) and a reference mark for orienting the sun-clock according to the longitude and an upright (hinged to an end of a support which can be drawn out from the base) bearing a semicircular sector, free to rotate round a pin, on which sector a latitude scale (graduate from 90° of latitude North to 90° of latitude South) is marked an index integral with the upright allows to read the latitude on the semicircular sector.

When the sun-clock is in a working position, the support is drawn out from the base and the upright is rotated round its hinge until it is perpendicular to said base, whereas when the sun-clock is in a rest position the support is retracted into the base and the upright, by rotating round its hinge, is pulled down onto said base.

PRIOR ART

Sun-clocks or sun-dials are well known and their use is lost in the mists of time. One knows very ancient sun-dials which are still exceptionally precise, if we take into account the very scanty scientific knowledge of those who made the sunlocks, and the shifting of the polar axis, which happened subsequently.

A large number of the known sun-dials are placed on a wall or on another fixed surface, the clock-face covers a time range which is limited to the period in which their gnomon is (or can be) illuminated by sunbeams and its tracing is, at any rate, correlated strictly to the orientation and to the geographic situation (longitude and latitude) of the surface the clock-face is is mounted on. Therefore we can state reasonably, that the clock-face of a sun-dial, which has been planned to operate in a definite place and with a definite orientation, is unique.

Moreover portable sun-dials (though they are less usual) are known as well. These sun-dials, even they are oriented correctly with respect to the sun, are sufficiently precise only in a rather limited geographic zone, whose latitude is not very different from the one of the place where the sun-dial was intended to be used.

A sun-clock, according to the invention, obviates, in a simple and efficient way, the limitations and inaccurancies which are inherent of the sun-dials of known type. In fact, it provides a portable sun-clock, capable of operating correctly in any place, as (besides being orientable easily with respect to the sun) it allows the user to take into account the latitude of the place where it is used.

SUMMARY OF THE INVENTION

The invention consists in a universal sun-clock comprising:

a base bearing a sun-dial, consisting of a clock-face and the respective time pointing tongue and of a reference mark for orienting said sun-dial according to longitude;

an upright, hinged to an end of a support which can be drawn out from the base; said upright bearing a semicircular sector free to rotate round a pin, on which sector a latitude scale (graduated from 90° of latitude North to 90° of latitude South) is marked; the sun-clock is angled, till the local latitude can be read on the semicircular sector, by means of an index integral with the upright.

When the sun-clock is in a working position the support is drawn out from the base and the upright is rotated round its hinge until it is perpendicular to said base, whereas when the sun-clock is in a rest position the support is retracted into the base and the upright, by rotating round its hinge, is pulled down onto said base.

BRIEF DESCRIPTION OF THE DRAWINGS

The invention will be better described with reference to the enclosed figures, where.

DESCRIPTION IN DETAIL

Figure 1:
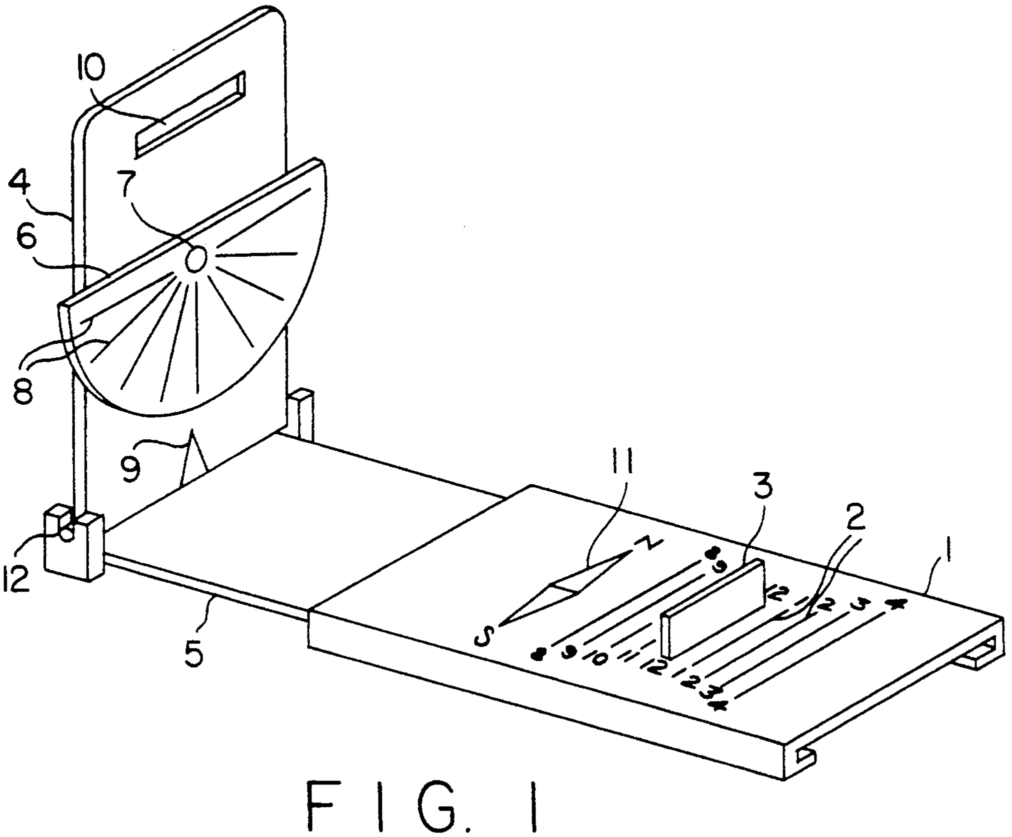
FIG. 1 shows a perspective view of a sun-clock, according to the invention, in a working position.

FIG. 1 shows a perspective view of a universal sun-clock according to the invention. One can see base 1 bearing a first clock-face 2 and respective time-pointing tongue 3 and upright 4 fastened to support 5 by means of hinge 12, which is upright, in the working position in FIG. 1, is drawn out from base 1; upright 4 bears semicircular sector 6, which is free to rotate round pin 7, on which sector latitude scale 8 (graduated from 90° of latitude North to 90° of latitude South) and index 9 for reading the latitude on semicircular sector 6 are marked.

Figure 3:
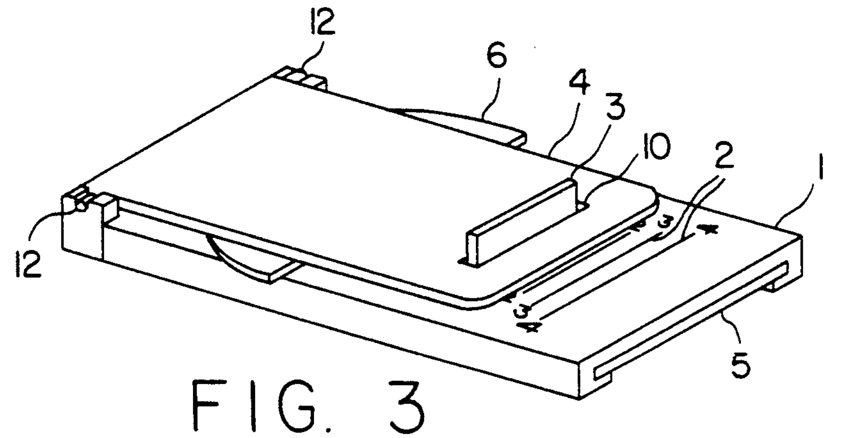
FIG. 3 shows a perspective view of the sun-clock of FIG. 1 in a rest position.
Figure 4:
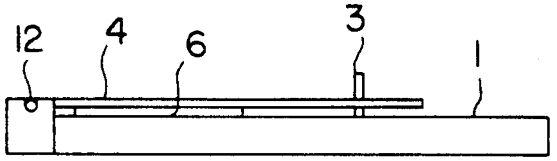
FIG. 4 shows a side view of the sun-clock of FIG. 3

In FIG. 1 number 10 shows an opening in upright 4, which is used for receiving the gnomon of time-pointing tongue 3, when the sun-clock is in a rest position (FIGS. 3 and 4).

Figure 2:
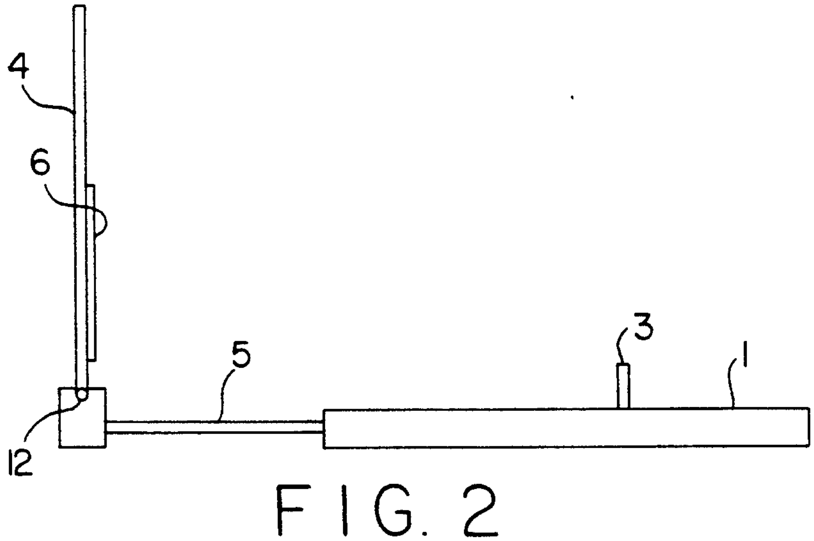
FIG. 2 shows a side view of the sun-clock of FIG. 1.

FIG. 2 shows a side view of sun-clock of FIG. 1, which is in a working position: support 5 is drawn out from the base 1 and upright 4, by rotating around hinge 12, has been brought to a position perpendicular to said base.

FIG. 3 shows a perspective view of the sun-clock of FIG. 1 in a rest position. In order to reduce the size sun-clock support 5 is retracted into base 1, and upright 4, is rotated around hinge 12 and is pulled down onto said base, as as can be seen distinctly from FIG. 4 which shows a side view of the sun-clock of FIG. 3. Time-pointing tongue 3 settles in opening 10, which is provided in upright 4 for this purpose.

The working of the sun-clock is as follows:

after having lifted upright 4, support 5 is drawn out from base 1 in a sufficient way as to prevent the shade of upright 4 from falling onto clock-face 2, thereby not allowing or anyhow interfering with the reading of the time indicated by time-pointing tongue 3.

the sun-clock is oriented by means of a compass so that needle 11 drawn on clock-face 2 is parallel and coincident with the one of the compass (the red part of both needles must be oriented towards the North);

the sun-clock is angled so that the latitude of the place, is read by means of index 8 on latitude scale 9 marked on semicircular sector 6.

The sun-clock indicates the "real" time of such a place, i.e. the time depending exclusively on the position of the sun in the sky, which time can be very different from the conventional one, as indicated by a customary clock.

Figure 5:
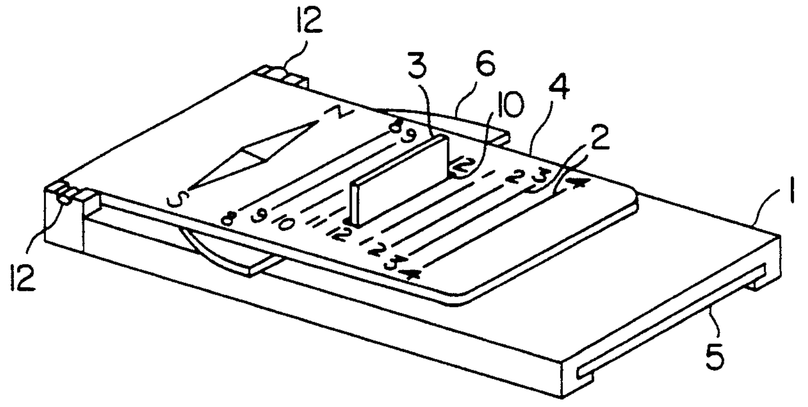
FIG. 5 is an alternate embodiment of the invention shown in FIG. 1.

First clock-face 2 allows to use the sun-clock, object of the present description, during the time (indicatively from 8 to 16 o'clock) when the sun is high enough above the horizon. If we want to use the universal sun-clock over a different time range, according to a possible embodiment, as shown in FIG. 5, the sun-clock comprises a second clock-face (with the respective time-pointing tongue) on the face of upright 4 opposite to the one, where semicircular sector 6 is applied. On one side of the time-pointing tongue one marks the lines corresponding to hours preceding said time range (indicatively from 5 to 8 o'clock), and on the other side of the time-pointing tongue one marks the lines corresponding to hours following said time range (indicatively from 16 to 19 o'clock). Finally, the universal sun-clock, which is the object of the present description, can be oriented by means of a compass, which is not incorporated or or mounted on said sun-clock. According to a possible embodiment the sun-clock is set up on (or however it is connected stiffly with) a support element suitable to receive a multifunctional spy-glass equipped, among other things, with a compass, thereby simplifying of the sun-clock in an exact way.

One who is skilled in the art, may modify the sun-clock, which is the object of the present invention, by using conventional techniques without departing from the scope of the invention.

We claim:

1. A universal sun-clock comprising:

(a) a base bearing a sun dial consisting of a calibrated plate to measure a time range and a gnomon which extends upward from said base, said base bearing a reference mark for orienting said sun dial according to longitude; and (b) an upright connected through a hinge at one end to a support member which allows said upright to move from a closed to an upright position; said support member being slidably attached to said base, said upright bearing a semicircular section being rotatably mounted on a pin in said upright, said semicircular section having a latitude scale on its face and said upright having an index mark to read the latitude on said semicircular section.

2. A universal sun-clock according to claim 1 wherein the latitude scale marked on said semicircular sector is graduated from 90° of latitude North to 90° of latitude South.

3. A universal sun-clock according to claim 1 wherein said upright has an opening in its surface which is sized to allow said gnomon to pass through said upright when said upright is rotated about said hinge to be on the surface of said base.

4. A sun-clock according to claim 3 wherein a second calibrated plate and a tongue to measure a second time range is on the face of said upright opposite the face of the face of said upright that supports said semicircular section, said second time range being a range preceding that measured by said first time range on said first calibrated plate.

* * * * *